(12) United States Patent
Liu et al.

(10) Patent No.: US 11,500,279 B2
(45) Date of Patent: Nov. 15, 2022

(54) OPTICAL MODULE AND PROJECTION APPARATUS

(71) Applicant: Coretronic Corporation, Hsin-Chu (TW)

(72) Inventors: Chien-Sheng Liu, Tainan (TW); Yu-Hao Chang, Tainan (TW); Chang-Lin Hsieh, Chiayi County (TW); Yi Chang, Hsin-Chu (TW); Shu-Yu Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 160 days.

(21) Appl. No.: 16/931,399

(22) Filed: Jul. 16, 2020

(65) Prior Publication Data

US 2021/0026230 A1  Jan. 28, 2021

Related U.S. Application Data

(60) Provisional application No. 62/877,844, filed on Jul. 24, 2019.

(30) Foreign Application Priority Data

May 18, 2020 (CN) .......................... 202020824593.4

(51) Int. Cl.
 *G03B 21/43* (2006.01)
 *G03B 21/20* (2006.01)
(52) U.S. Cl.
 CPC ......... *G03B 21/43* (2013.01); *G03B 21/2033* (2013.01); *G03B 21/2053* (2013.01)

(58) Field of Classification Search
 None
 See application file for complete search history.

(56) References Cited

U.S. PATENT DOCUMENTS

| 2008/0304017 A1* | 12/2008 | Chen | G02B 27/46 |
| | | | 353/30 |
| 2020/0004123 A1* | 1/2020 | Chang | G02F 1/091 |

FOREIGN PATENT DOCUMENTS

| JP | 2012050179 A | * | 3/2012 | |
| TW | M260054 | | 3/2005 | |
| WO | WO-2019007198 A1 | * | 1/2019 | ............. B65G 43/08 |

* cited by examiner

*Primary Examiner* — Bao-Luan Q Le
*Assistant Examiner* — Danell L Owens
(74) *Attorney, Agent, or Firm* — JCIPRNET (57) ABSTRACT

An optical module and a projection apparatus using the optical module are provided. The optical module includes a base, a first frame, an optical element and at least one driving assembly. The first frame is disposed in the base. The optical element is disposed in the first frame. The at least one driving assembly is disposed between the base and the first frame. The first frame is configured to move relative to the base by a magnetic force generated by the at least one driving assembly. Each of the at least one driving assembly includes a coil and a Halbach array magnet structure, the coil and the Halbach array magnet structure face each other along a first direction, a width of the Halbach array magnet structure in the first direction is W1, and a width of the coil in the first direction is W2, and 0.7≤W1/W2≤2.

12 Claims, 6 Drawing Sheets

OPTICAL MODULE AND PROJECTION APPARATUS

CROSS-REFERENCE TO RELATED APPLICATION

This application claims the priority benefit of U.S. provisional application Ser. No. 62/877,844, filed on Jul. 24, 2019, and China application serial no. 202020824593.4, filed on May 18, 2020. The entirety of each of the above-mentioned patent applications is hereby incorporated by reference herein and made a part of this specification.

BACKGROUND

Technical Field

The disclosure relates to an optical module and a projection apparatus, and particularly relates to an optical module including a Halbach array magnet structure and a projection apparatus.

Description of Related Art

A projector is a display device for generating images. The imaging principle of the projector is to convert an illumination light beam generated by a light source into an image light beam by a light valve, and then project the image light beam onto a screen or wall through a projection lens.

At present, there is a trend of reducing the volume in the production of projectors. With the requirement of achieving high resolution at the same time, the resolution of an image converted by the light valve has gradually failed to meet the market demand. In order to further increase the image resolution, a high-resolution light valve may be applied in the projector, but the cost of the projection apparatus will be high. Moreover, in some projectors, an optical module with optical vibration technology may be additionally configured, in which an optical element is reciprocally swung by a magnetic force generated by a driving assembly. When the image light beam from the light valve passes through the optical element, a resolution of the image may be enhanced through vibration of the optical element. On the other hand, if a laser is used as the light source of the projector, unevenness on a projection surface may easily cause an optical path difference of the laser, which results in a laser speckle of a projected image. In order to resolve the above issue, some projectors drive the optical element to reciprocally translate through the magnetic force generated by the driving assembly, and when a light beam generated by the laser light source in the projector passes through the optical element, the laser speckle may be reduced through the reciprocating translation of the optical element. Based on the above, in response to the trend of miniaturization of the projectors, a small-sized driving assembly may be used to generate a magnetic force large enough to drive the optical element to perform the above-mentioned reciprocating swing or reciprocating translation in order to achieve good projection quality without excessively increasing the device volume.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an optical module and a projection apparatus, which are adapted to enhance a magnetic force generated by a driving assembly.

Other objectives and advantages of the invention may be further illustrated by the technical features broadly embodied and described as follows.

In order to achieve one or a portion of or all of the objectives or other objectives, an embodiment of the invention provides an optical module including a base, a first frame, an optical element and at least one driving assembly. The first frame is disposed in the base. The optical element is disposed in the first frame. The at least one driving assembly is disposed between the base and the first frame. The first frame is configured to move relative to the base by a magnetic force generated by the at least one driving assembly. Each of the at least one driving assembly includes a coil and a Halbach array magnet structure, the coil and the Halbach array magnet structure face each other along a first direction, a width of the Halbach array magnet structure in the first direction is W1, and a width of the coil in the first direction is W2, and $0.7 \leq W1/W2 \leq 2$.

In order to achieve one or a portion of or all of the objectives or other objectives, an embodiment of the invention provides a projection apparatus including an illumination system, a light valve, a projection lens, and an optical module. The illumination system is configured to emit an illumination light beam. The light valve is located on a transmission path of the illumination light beam, and is configured to convert the illumination light beam into an image light beam. The projection lens is located on a transmission path of the image light beam, and is configured to project the image light beam. The optical module is disposed between the light valve and the projection lens and includes a base, a first frame, an optical element and at least one driving assembly. The first frame is disposed in the base. The optical element is disposed in the first frame. The at least one driving assembly is disposed between the base and the first frame. The first frame is configured to move relative to the base by a magnetic force generated by the at least one driving assembly. Each of the at least one driving assembly includes a coil and a Halbach array magnet structure, the coil and the Halbach array magnet structure face each other along a first direction, a width of the Halbach array magnet structure in the first direction is W1, and a width of the coil in the first direction is W2, and $0.7 \leq W1/W2 \leq 2$.

Based on the above description, the embodiments of the invention have at least one of following advantages or effects. In the driving assembly of the invention, a general magnet is replaced by the Halbach array magnet structure, and a large magnetic force is produced through collaboration of the Halbach array magnet structure and the coil to drive the optical element to move. Moreover, a ratio of the width of the Halbach array magnet structure to the width of the coil is limited to 0.7-2, so as to further enhance the magnetic force. Therefore, the small-volume driving assembly may produce a magnetic force large enough to smoothly drive the optical element to reciprocally move, so as to provide good projection quality without excessively increasing a device volume.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
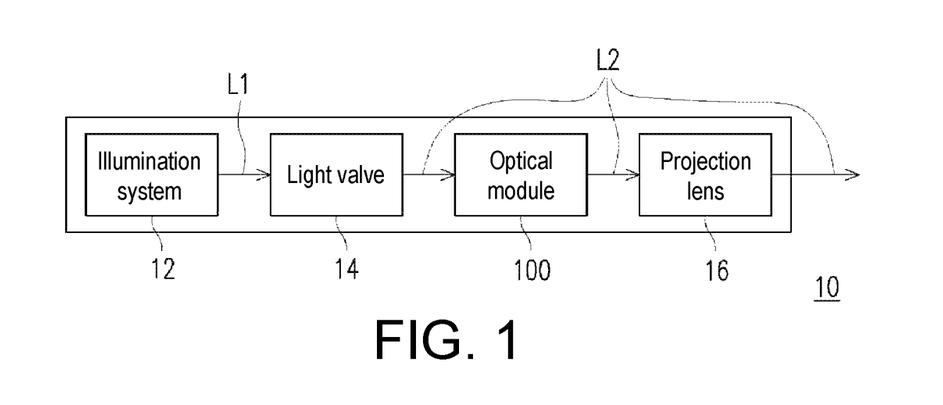
FIG. 1 is a schematic diagram of a projection apparatus according to an embodiment of the invention.

FIG. 1 is a schematic diagram of a projection apparatus according to an embodiment of the invention. Referring to FIG. 1, a projection apparatus 10 of the embodiment includes an illumination system 12, a light valve 14, an optical module 100, and a projection lens 16. The illumination system 12 is configured to provide an illumination light beam L1. The light valve 14 is, for example, a digital micro-mirror device (DMD), which is located on a transmission path of the illumination light beam L1 and is configured to convert the illumination light beam L1 into an image light beam L2. In other embodiments, the light valve 14 may also be a reflective light modulator such as a liquid crystal on silicon panel (LCoS panel), etc., or may be a transmissive light modulator such as a transparent liquid crystal panel, an electro-optical modulator, a magneto-optic modulator, an acousto-optic modulator (AOM), etc. The projection lens 16 is located on a transmission path of the image light beam L2 and is configured to project the image light beam L2. The projection lens 16, for example, includes one or a combination of a plurality of optical lenses with refractive powers, for example, various combinations of non-planar lenses such as a biconcave lens, a biconvex lens, a concavo-convex lens, a convexo-concave lens, a plano-convex lens, a plano-concave lens, etc. In other embodiments, the projection lens 16 may further include a planar optical lens to project the image light beam L2 to a projection target in a reflective manner. The invention does not limit the pattern and the type of the projection lens 16. The optical module 100 is disposed between the light valve 14 and the projection lens 16 to perform optical vibration to enhance the resolution of the image light beam L2 (i.e., the resolution of a projected image) converted by the light valve 14.

Figure 2:
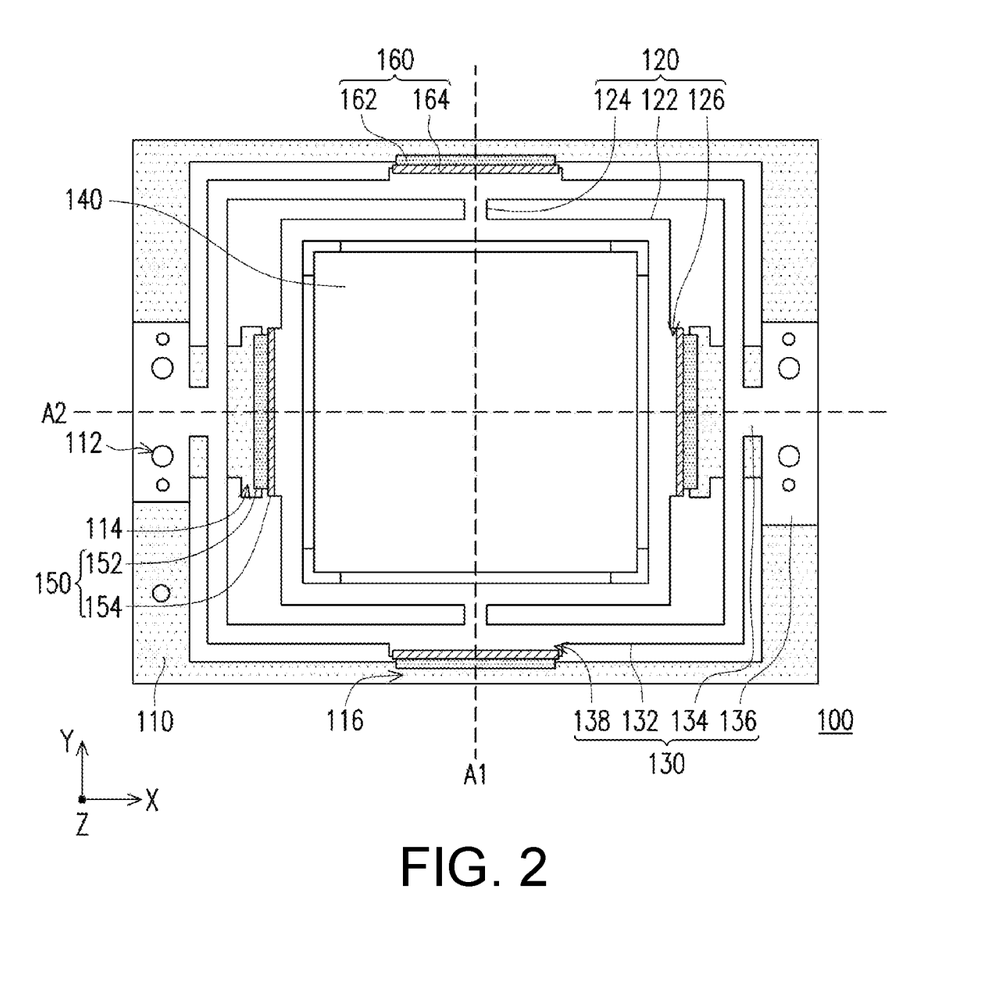
FIG. 2 is a schematic diagram of an optical module of FIG. 1.

FIG. 2 is a schematic diagram of the optical module of FIG. 1. For simplicity's sake, a first direction X, a second direction Z and a third direction Y are defined in FIG. 2. Referring to FIG. 2, the optical module 100 of the embodiment includes a base 110, a first frame 120, a second frame 130, an optical element 140 and at least one driving assembly (two driving assemblies 150 and two driving assemblies 160 are illustrated). The first frame 120, the second frame 130, and the optical element 140 are disposed in the base 110, where the second frame 130 is connected to the base 110, the first frame 120 is disposed in the second frame 130 and connected to the second frame 130, and the optical element 140 is, for example, a light-transmitting element and is disposed in the first frame 120.

The driving assemblies 150 and 160 are disposed between the base 110 and the first frame 120, so that the first frame 120 and the optical element 140 therein may move relative to the base 110 by magnetic forces generated by the driving assemblies 150 and 160. To be specific, the two driving assemblies 150 are respectively disposed on two opposite sides of the first frame 120 and located between the first frame 120 and the second frame 130, and the two driving assemblies 160 are disposed on two opposite sides of the second frame 130 and located between the second frame 130 and the base 110. The magnetic force generated by each driving assembly 150 may drive the first frame 120 and the optical element 140 therein to reciprocally swing relative to the second frame 130 while taking a first axis A1 (e.g., parallel to the third direction Y) as a rotation axis, and the magnetic force generated by each driving assembly 160 may drive the second frame 130 and the first frame 120 and the optical element 140 therein to reciprocally swing relative to the base 110 while taking a second axis A2 (e.g., parallel to the first direction X) perpendicular to the first axis A1 as the rotation axis. In this way, the optical element 140 vibrates due to its reciprocating swing around the first axis A1 and the second axis A2, so that when the image light beam L2 from the light valve 14 (shown in FIG. 1) passes through the optical element 140, a resolution of an image may be enhanced by the optical element 140.

Further, referring to FIG. 2, each driving assembly 150 includes a coil 152 and a Halbach array magnet structure 154, the coil 152 and the Halbach array magnet structure 154 face each other in the first direction X parallel to the second axis A2, and there is a gap between the coil 152 and the Halbach array magnet structure 154. Similarly, each driving assembly 160 includes a coil 162 and a Halbach array magnet structure 164, the coil 162 and the Halbach array magnet structure 164 face each other in the third direction Y parallel to the first axis A1, and there is a gap between the coil 162 and the Halbach array magnet structure 164.

Figure 3:
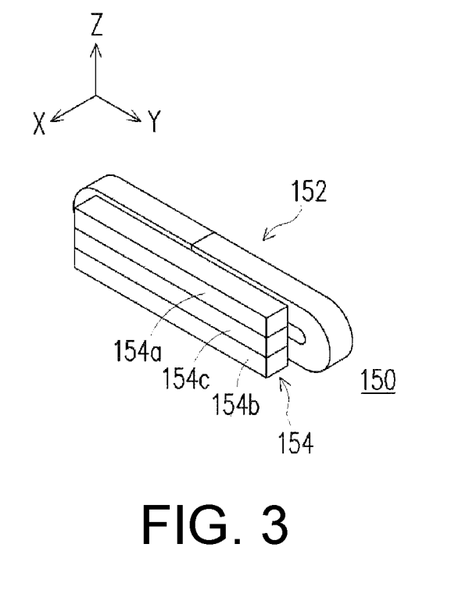
FIG. 3 is a pictorial view of a driving assembly of FIG. 2.
Figure 4:
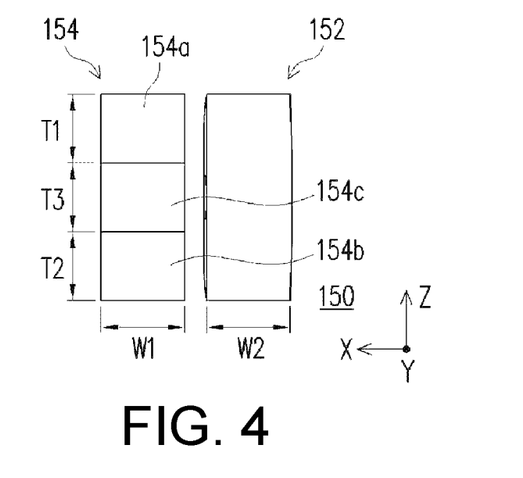
FIG. 4 is a side view of the driving assembly of FIG. 3.

FIG. 3 is a pictorial view of a driving assembly of FIG. 2. FIG. 4 is a side view of the driving assembly of FIG. 3. Referring to FIG. 3 and FIG. 4, a width of the Halbach array magnet structure 154 in the first direction X is W1 (indicated in FIG. 4), and a width of the coil 152 in the first direction X is W2 (indicated in FIG. 4), and $0.7 \leq W1/W2 \leq 2$. Widths of the Halbach array magnet structure 164 and the coil 162 of FIG. 2 in the third direction Y may also have the same or similar proportional relationship, which is not repeated.

In the driving assemblies 150 and 160 of the embodiment, the general magnets are replaced by the Halbach array magnet structures 154 and 164 as described above, and the large magnetic force generated through collaboration of the Halbach array magnet structures 154 and 164 and the coils 152 and 162 drives the optical element 140 to move. Moreover, a ratio of the widths of the Halbach array magnet structures 154 and 164 to the widths of the coils 152 and 162 is limited to 0.7-2 as described above, so as to further enhance the magnetic force. Therefore, the small-volume driving assemblies 150 and 160 may produce a magnetic force large enough to drive the optical element 140 to reciprocally move (e.g., swing), so as to provide good projection quality without excessively increasing a device volume.

Referring to FIG. 3 and FIG. 4, in the embodiment, the Halbach array magnet structure 154 includes a first magnet 154a, a second magnet 154b and a third magnet 154c. The first magnet 154a, the second magnet 154b and the third magnet 154c are stacked on each other (a stack setting) along the second direction Z perpendicular to the first direction X and the third direction Y, the third magnet 154c is located between the first magnet 154a and the second magnet 154b, a thickness of the first magnet 154a in the second direction Z is T1, a thickness of the second magnet 154b in the second direction Z is T2, and a thickness of the third magnet 154c in the second direction Z is T3, and $0.9 \leq T1/T2 \leq 1.1$, so that the Halbach array magnet structure 154 has a strong magnetic field. For example, the relationship of the thicknesses of the first magnet 154a, the second magnet 154b, and the third magnet 154c in the second direction Z may be designed as $T1:T2:T3=1:1:1$. In addition, respective polar directions of the first magnet 154a, the second magnet 154b, and the third magnet 154c may be configured according to the definition of the well-known Halbach array, which is not repeated.

Figure 5:
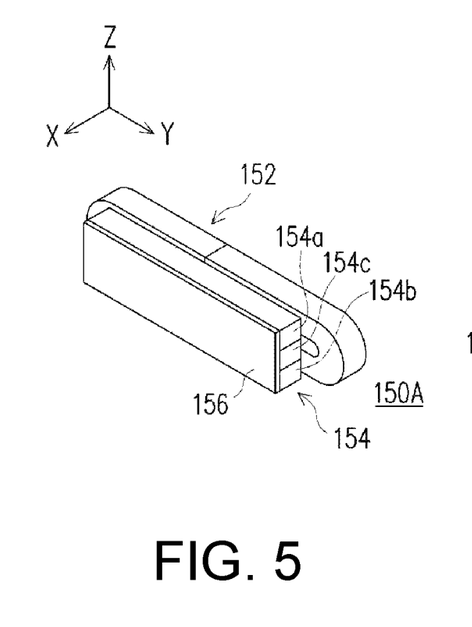
FIG. 5 is a pictorial view of a driving assembly according to another embodiment of the invention.
Figure 6:
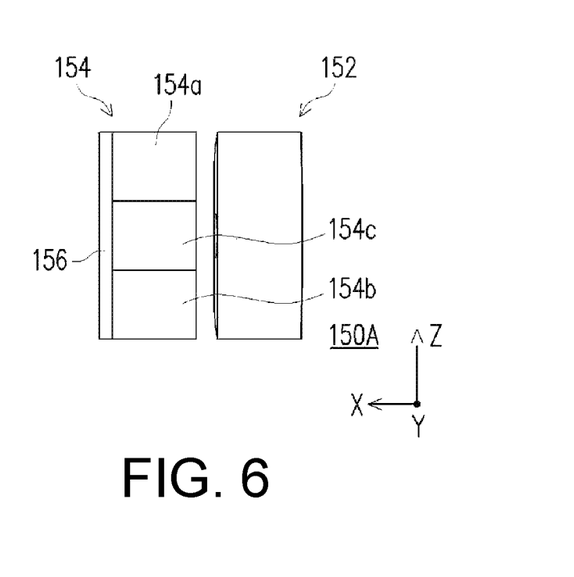
FIG. 6 is a side view of the driving assembly of FIG. 5.

FIG. 5 is a pictorial view of a driving assembly according to another embodiment of the invention. FIG. 6 is a side view of the driving assembly of FIG. 5. A difference between a driving assembly 150A of FIG. 5 and FIG. 6 and the driving assembly 150 of FIG. 3 and FIG. 4 is that the driving assembly 150A further includes a magnetic permeable plate 156, and the magnetic permeable plate 156 is disposed on the Halbach array magnet structure 154, and the Halbach array magnet structure 154 is located between the magnetic permeable plate 156 and the coil 152. The magnetic permeable plate 156 may increase an electromagnetic shielding effect of the driving assembly 150A. In addition, the first magnet 154a, the second magnet 154b, and the third magnet 154c may be fixed together on the magnetic permeable plate 156 to achieve easy assembling. The magnetic permeable plate 156 is, for example, a yoke, but the invention is not limited thereto. The driving assembly 160 may also include a magnetic permeable plate and may be configured in the same or similar manner as the driving component 150A of FIG. 5 and FIG. 6, and detail thereof is not repeated.

Figure 7:
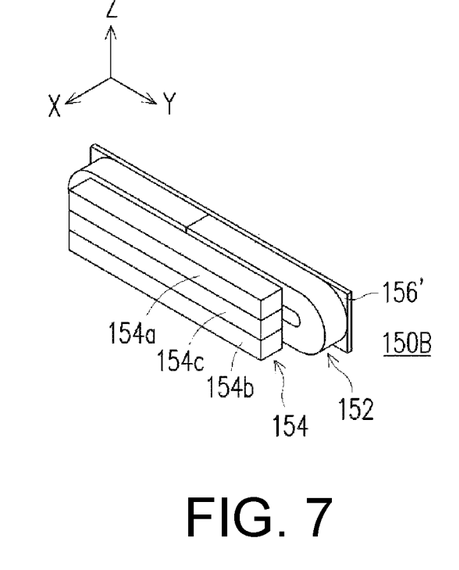
FIG. 7 is a pictorial view of a driving assembly according to another embodiment of the invention.
Figure 8:
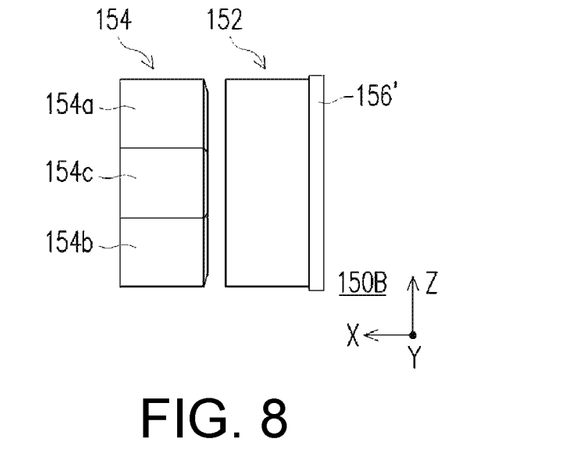
FIG. 8 is a side view of the driving assembly of FIG. 7.

FIG. 7 is a pictorial view of a driving assembly according to another embodiment of the invention. FIG. 8 is a side view of the driving assembly of FIG. 7. A difference between a driving assembly 150B of FIG. 7 and FIG. 8 and the driving assembly 150 of FIG. 3 and FIG. 4 is that the driving assembly 150B further includes a magnetic permeable plate 156', and the magnetic permeable plate 156' is disposed on the coil 152, and the coil 152 is located between the magnetic permeable plate 156' and the Halbach array magnet structure 154. The magnetic permeable plate 156' may increase an electromagnetic shielding effect of the driving assembly 150B. In addition, configuration of the magnetic permeable plate 156' may enhance a magnetic field of the Halbach array magnet structure 154 functioned on the coil 152. The magnetic permeable plate 156' is, for example, a yoke, but the invention is not limited thereto. The driving assembly 160 may also include a magnetic permeable plate and may be configured in the same or similar manner as the driving component 150B of FIG. 7 and FIG. 8, and detail thereof is not repeated.

Figure 9:
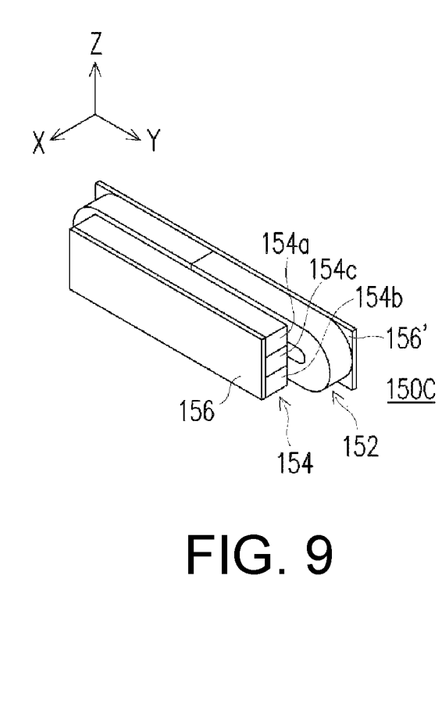
FIG. 9 is a pictorial view of a driving assembly according to another embodiment of the invention.
Figure 10:
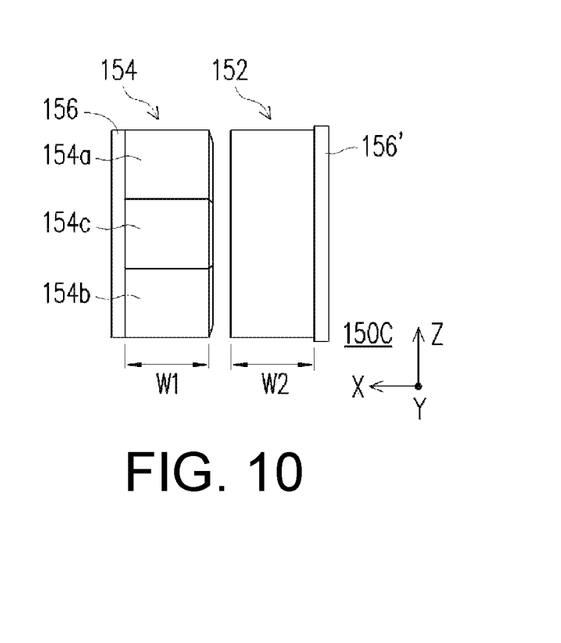
FIG. 10 is a side view of the driving assembly of FIG. 9.

FIG. 9 is a pictorial view of a driving assembly according to another embodiment of the invention. FIG. 10 is a side view of the driving assembly of FIG. 9. A difference between a driving assembly 150C of FIG. 9 and FIG. 10 and the driving assembly 150 of FIG. 3 and FIG. 4 is that the driving assembly 150C further includes a magnetic permeable plate 156 and a magnetic permeable plate 156', the magnetic permeable plate 156 and the magnetic permeable plate 156' are respectively disposed on the Halbach array magnet structure 154 and the coil 152, and the Halbach array magnet structure 154 and the coil 152 are located between the magnetic permeable plate 156 and the magnetic permeable plate 156'. The magnetic permeable plate 156 and the magnetic permeable plate 156' may increase an electromagnetic shielding effect of the driving assembly 150C. In addition, the first magnet 154a, the second magnet 154b, and the third magnet 154c may be fixed together on the magnetic permeable plate 156 to achieve easy assembling. Moreover, configuration of the magnetic permeable plate 156' may enhance the magnetic field of the Halbach array magnet structure 154 functioned on the coil 152. Under the configuration of the driving assembly 150C shown in FIG. 9 and FIG. 10, a relationship between the width W1 of the Halbach array magnet structure 154 and the width W2 of the coil 152 may be 0.7≤W1/W2≤1.667, so as to further enhance the magnetic force generated by the driving assembly 150C. The magnetic permeable plate 156 and the magnetic permeable plate 156' are, for example, yokes, but the invention is not limited thereto. The driving assembly 160 may also include magnetic permeable plates and may be configured in the same or similar manner as the driving component 150C of FIG. 9 and FIG. 10, and detail thereof is not repeated.

Structures of the base 110, the first frame 120 and the second frame 130 are described in detail with reference of the embodiment of FIG. 2. Referring to FIG. 2, the base 110 includes a positioning portion 112 and assembling portions 114 and 116, the first frame 120 includes a frame portion 122, two shaft portions 124 and an assembling portion 126, and the second frame 130 includes a frame portion 132, two shaft portions 134, a fixing portion 136 and an assembling portion 138. The coil 152 and the coil 162 are respectively disposed on the assembling portion 114 and the assembling portion 116, and the Halbach array magnet structure 154 and the Halbach array magnet structure 164 are respectively disposed on the assembling portion 126 and the assembling portion 138. The positioning portion 112 may fix the fixing portion 136 of the second frame 130 to the base 110 through a locking member (not shown). The frame portion 132, the shaft portion 134, the fixing portion 136, and the assembling portion 138 may be formed integrally, but the invention is not limited thereto. The two shaft portions 134 are connected to two opposite sides of the frame portion 132 and located on the second axis A2, and are connected between the fixing portion 136 and the frame portion 132, so that the second frame 130 may be reciprocally swung relative to the base 110 while taking the second axis A2 as a rotation axis. The frame portion 122, the two shaft portions 124, and the assembling portion 126 may be formed integrally, but the invention is not limited thereto. The frame portion 122 is configured to carry the optical element 140, the two shaft portions 124 are connected to two opposite sides of the frame portion 122 and located on the first axis A1, and are configured to connect the frame portion 132 of the second frame 130, so that the first frame 120 may be reciprocally swung relative to the second frame 130 while taking the first axis A1 as a rotation axis.

The invention does not limit the number of the driving assemblies and the number of the frames, which is described below with reference of drawings.

Figure 11:
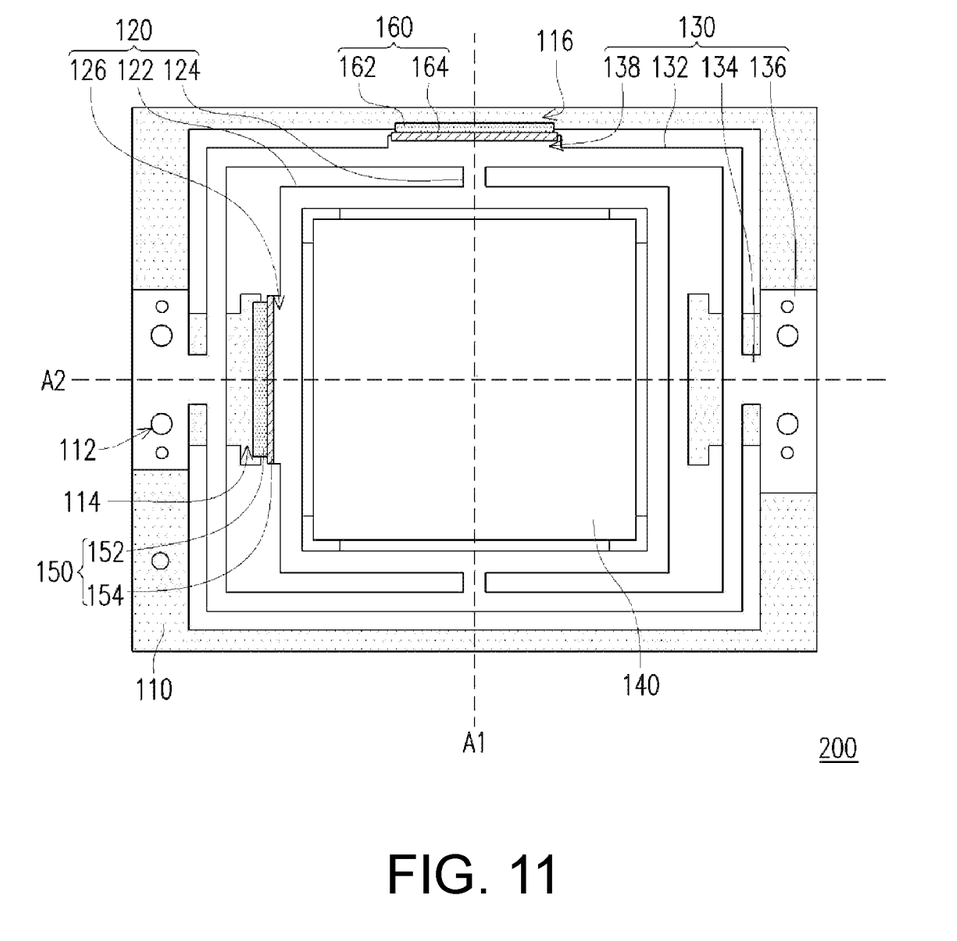
FIG. 11 is a schematic diagram of an optical module according to another embodiment of the invention.
Figure 12:
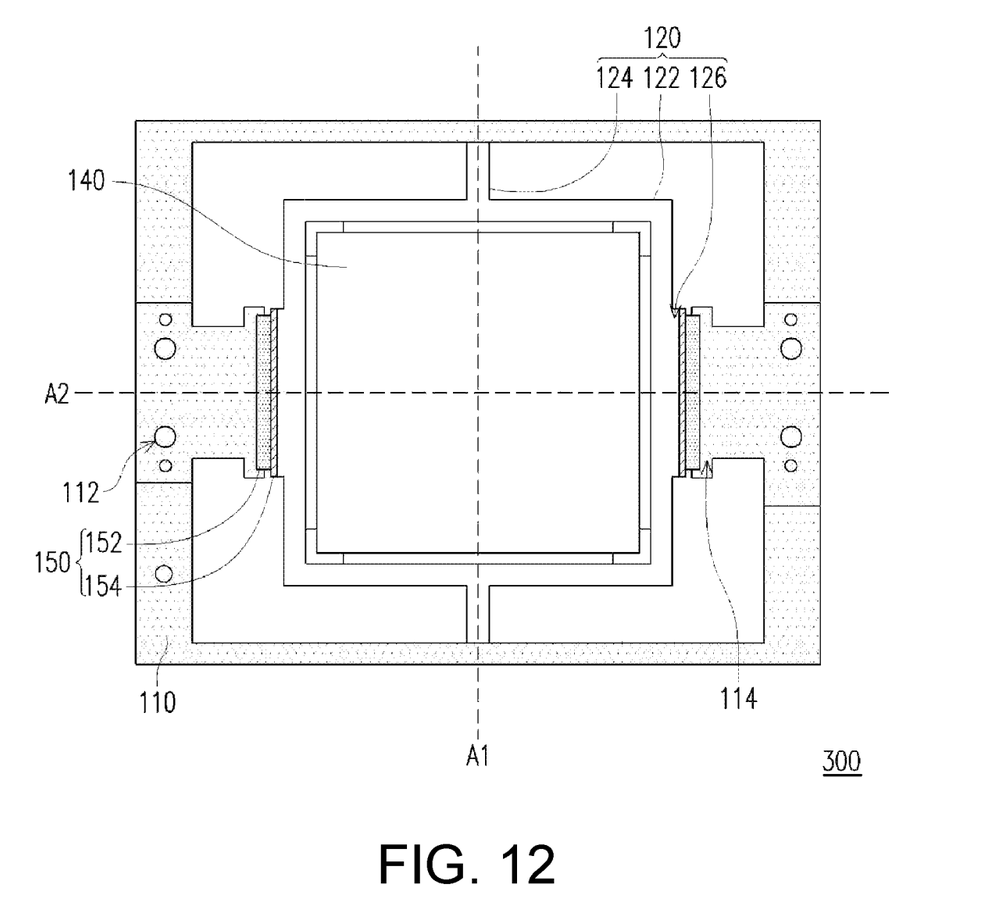
FIG. 12 is a schematic diagram of an optical module according to another embodiment of the invention.
Figure 13:
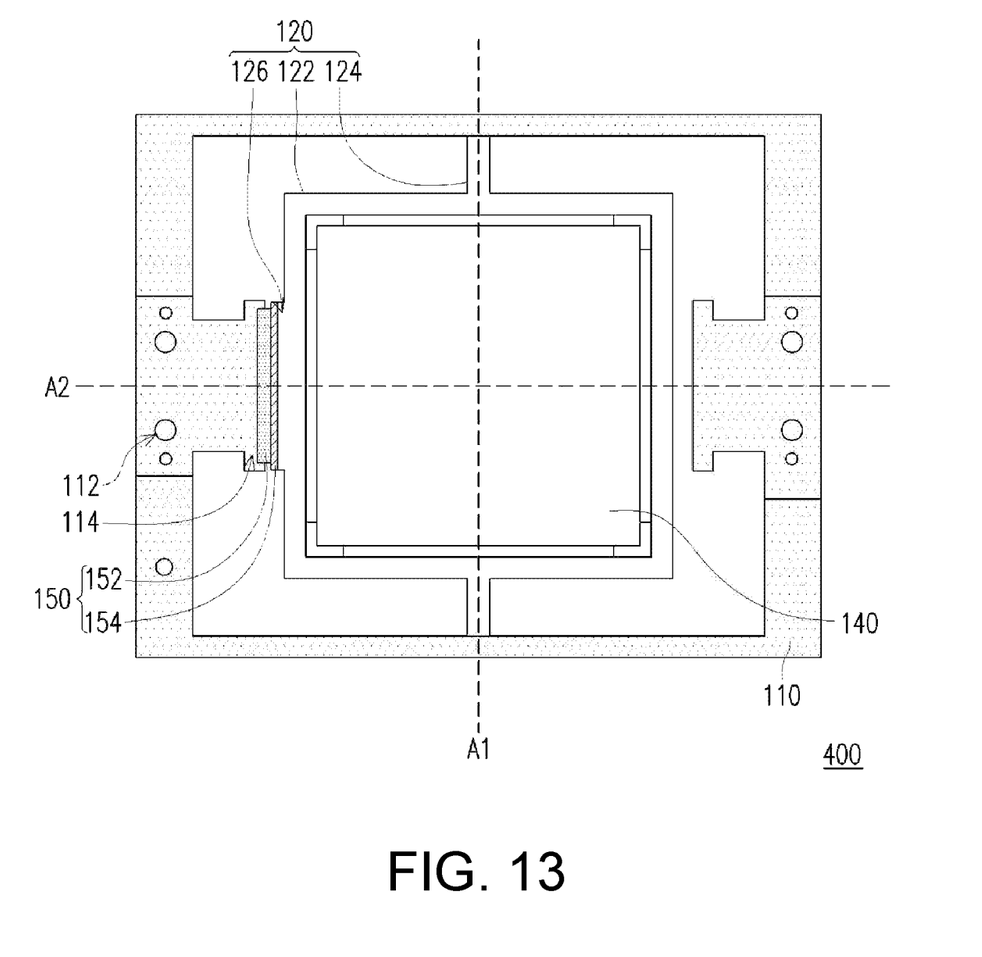
FIG. 13 is a schematic diagram of an optical module according to another embodiment of the invention.

FIG. 11 is a schematic diagram of an optical module according to another embodiment of the invention. A difference between an optical module 200 shown in FIG. 11 and the optical module 100 shown in FIG. 2 is that the number of the driving assembly 150 is one, and the driving assembly 150 is arranged on one side of the first frame 120, and the number of the driving assembly 160 is one, and the driving assembly 160 is arranged on one side of the second frame 130. FIG. 12 is a schematic diagram of an optical module according to another embodiment of the invention. A difference between an optical module 300 shown in FIG. 12 and the optical module 100 shown in FIG. 2 is that the optical module 300 does not include the second frame 130 and the driving assembly 160, and the shaft portion 124 of the first frame 120 is directly connected to the base 110. FIG. 13 is a schematic diagram of an optical module according to another embodiment of the invention. A difference between an optical module 400 shown in FIG. 13 and the optical module 300 shown in FIG. 12 is that the number of the driving assembly 150 is one, and the driving assembly 150 is disposed on one side of the first frame 120.

In the aforementioned embodiments, the optical module performs optical vibration that is swung while taking the first axis A1 or the second axis A2 as the rotation axis through the driving assemblies to enhance the resolution of the image light beam L2 converted by the light valve 14. However, in other embodiments that are not illustrated, the driving assemblies of the invention may also be applied to optical modules that perform other types of optical vibrations. For example, the driving assemblies may be applied to an optical module that vibrates in a manner of a linear path translation or a circular path translation, etc., and the optical element arranged in the optical module is, for example, a diffusion element or a micro lens array element, etc., in this way, the optical module may be used to reduce a laser speckle.

In summary, the embodiments of the invention have at least one of following advantages or effects. In the driving assembly of the invention, the general magnet is replaced by the Halbach array magnet structure, and a large magnetic force is produced through collaboration of the Halbach array magnet structure and the coil to drive the optical element to move. Moreover, a ratio of the width of the Halbach array magnet structure to the width of the coil is limited to 0.7-2, so as to further enhance the magnetic force. Therefore, the small-volume driving assembly may produce a magnetic force large enough to smoothly drive the optical element to reciprocally move, so as to provide good projection quality without excessively increasing a device volume. In addition, the multiple magnets included in the Halbach array magnet structure may be arranged on the magnetic permeable plate together to achieve easy assembling. Moreover, the coil may be located between the Halbach array magnet structure and the magnetic permeable plate to enhance the magnetic field of the Halbach array magnet structure functioned on the coil.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may use "first", "second", etc. followed with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical module comprising a base, a first frame, an optical element and at least one driving assembly, wherein
the first frame is disposed in the base,
the optical element is disposed in the first frame, and
the at least one driving assembly is disposed between the base and the first frame, wherein the first frame is configured to move relative to the base by a magnetic force generated by the at least one driving assembly, each of the at least one driving assembly comprises a coil and a Halbach array magnet structure, the coil and the Halbach array magnet structure face each other along a first direction, a width of the Halbach array magnet structure in the first direction is W1, and a width of the coil in the first direction is W2, and $0.7 \leq W1/W2 \leq 2$.

2. The optical module as claimed in claim 1, wherein each of the at least one driving assembly further comprises a magnetic permeable plate, the magnetic permeable plate is disposed on the coil, and the coil is located between the magnetic permeable plate and the Halbach array magnet structure.

3. The optical module as claimed in claim 1, wherein each of the at least one driving assembly further comprises a magnetic permeable plate, the magnetic permeable plate is disposed on the Halbach array magnet structure, and the Halbach array magnet structure is located between the magnetic permeable plate and the coil.

4. The optical module as claimed in claim 3, wherein the Halbach array magnet structure comprises a first magnet, a second magnet, and a third magnet, and the first magnet, the second magnet, and the third magnet are stacked with each other in a second direction perpendicular to the first direction and are all fixed to the magnetic permeable plate.

5. The optical module as claimed in claim 1, wherein each of the at least one driving assembly further comprises two magnetic permeable plates, the two magnetic permeable plates are respectively disposed on the coil and the Halbach array magnet structure, and the coil and the Halbach array magnet structure are located between the two magnetic permeable plates.

6. The optical module as claimed in claim 5, wherein $0.7 \leq W1/W2 \leq 1.667$.

7. The optical module as claimed in claim 1, wherein the Halbach array magnet structure comprises a first magnet, a second magnet, and a third magnet, and the first magnet, the second magnet, and the third magnet are stacked with each other in a second direction perpendicular to the first direction, the third magnet is located between the first magnet and the second magnet, a thickness of the first magnet in the second direction is T1, a thickness of the second magnet in the second direction is T2, and $0.9 \leq T1/T2 \leq 1.1$.

8. The optical module as claimed in claim 7, wherein a thickness of the third magnet in the second direction is T3, and $T1:T2:T3=1:1:1$.

9. The optical module as claimed in claim 1, wherein the at least one driving assembly comprises two driving assemblies, and the two driving assemblies are respectively located on two opposite sides of the first frame.

10. The optical module as claimed in claim 1, further comprising a second frame, wherein the second frame is connected to the base, the first frame is disposed in the second frame and is connected to the second frame, the at least one driving assembly comprises two driving assemblies, one of the two driving assemblies is located between the first frame and the second frame, and the other of the two driving assemblies is located between the second frame and the base.

11. The optical module as claimed in claim 1, further comprising a second frame, wherein the second frame is connected to the base, the first frame is disposed in the second frame and is connected to the second frame, the at least one driving assembly comprises four driving assemblies, two of the four driving assemblies are located between the first frame and the second frame and are respectively located on two opposite sides of the first frame, and the other two of the four driving assemblies are located between the second frame and the base and are respectively located on two opposite sides of the second frame.

12. A projection apparatus comprising an illumination system, a light valve, a projection lens, and an optical module, wherein
the illumination system is configured to emit an illumination light beam,
the light valve is located on a transmission path of the illumination light beam and is configured to convert the illumination light beam into an image light beam,
the projection lens is located on a transmission path of the image light beam and is configured to project the image light beam, and
the optical module is disposed between the light valve and the projection lens and comprises a base, a first frame, an optical element and at least one driving assembly, wherein
the first frame is disposed in the base,
the optical element is disposed in the first frame, and
the at least one driving assembly is disposed between the base and the first frame, wherein the first frame is configured to move relative to the base by a magnetic force generated by the at least one driving assembly, each of the at least one driving assembly comprises a coil and a Halbach array magnet structure, the coil and the Halbach array magnet structure face each other along a first direction, a width of the Halbach array magnet structure in the first direction is W1, a width of the coil in the first direction is W2, and $0.7 \leq W1/W2 \leq 2$.

* * * * *